United States Patent [19]

Duling, III

[11] Patent Number: 5,050,183
[45] Date of Patent: Sep. 17, 1991

[54] FIGURE EIGHT SHAPED COHERENT OPTICAL PULSE SOURCE

[75] Inventor: Irl N. Duling, III, Middleburg, Va.

[73] Assignee: The United States of America as represented by the Secretary of the Navy, Washington, D.C.

[21] Appl. No.: 608,764

[22] Filed: Nov. 5, 1990

[51] Int. Cl.$^5$ .............................................. H01S 3/083
[52] U.S. Cl. .......................................... 372/94; 372/6; 372/25; 372/106; 372/703; 385/27; 385/32; 385/141
[58] Field of Search .................... 372/6, 94, 99, 98, 21, 372/703, 25, 106; 356/350; 350/96.15; 250/227.19, 227.27

[56] References Cited

U.S. PATENT DOCUMENTS

| | | | |
|---|---|---|---|
| 3,805,188 | 4/1974 | Wuerker et al. | 372/94 X |
| 4,247,831 | 1/1981 | Lindop | 356/350 X |
| 4,420,258 | 12/1983 | Burns et al. | 356/350 |
| 4,436,422 | 3/1984 | Schiffner | 356/349 |
| 4,635,263 | 1/1987 | Mollenauer | 372/3 |
| 4,671,658 | 6/1987 | Shaw et al. | 356/350 |
| 4,707,835 | 11/1987 | Mocker | 372/20 |
| 4,815,853 | 3/1989 | Lefevre | 356/350 |
| 4,835,778 | 5/1989 | Kafka et al. | 372/6 |
| 4,839,898 | 6/1989 | Payne et al. | 372/6 |
| 4,904,041 | 2/1990 | Izadpanah | 350/96.15 |
| 4,969,017 | 11/1990 | Lefevre et al. | 356/350 |

OTHER PUBLICATIONS

"Low-Noise Ebrium-Doped Fiber Amplifier Operating at 1.54 μm," Mears et al., Electronic Letter, vol. 23, p. 1026 (1987).
"Subpicosecond Soliton Amplification and Transmission Using Er$^{3+}$-Doped Fibers Pumped by InGaAsP Laser Diodes," Optics Letter, vol. 14, No. 16, pp. 865 (1989), Suzuki et al.
"The Soliton Laser," Optics Letters, Mollenauer et al., vol. 9, No. 1, pp. 13-15 (Jan. 1984).
"A Mirror with an Intensity-Dependent Reflection Coefficient," Stankov, Applied Physics B, vol. 45, pp. 191-195 (1988).
"Nonlinear Optical Loop Mirror", Doran et al., Optics Letter, vol. 13, No. 1, pp. 56-58 (Jan. 1988).
"Experimental Demonstration of Optical Soliton Switching in an All-Fiber Nonlinear Sagnac Interferometer," Blow et al., Optics Letters, vol. 14, No. 14, pp. 754-756 (Jul. 1989).
"Nonlinear Amplifying Loop Mirror," Fermann et al., Optics Letters, vol. 15, No. 13, pp. 752-754 (Jul. 1990).

Primary Examiner—William L. Sikes
Assistant Examiner—Galen J. Hansen
Attorney, Agent, or Firm—Thomas E. McDonnell; George Jameson

[57] ABSTRACT

An optical pulse source for producing short optical pulses comprises first and second optical loops coupled together by a beam splitter so as to define a figure eight optical path in which a light beam propagating toward the beam splitter in one of the first and second loops is split by the beam splitter to form two light beams propagating in opposite directions around the other of the first and second loops. The first loop includes a direction dependent loss element for reducing the intensity of light propagating in a predetermined direction around the first loop, and the second loop includes an element having an intensity dependent nonlinear optical transmission characteristic. One of the first and second loops includes an optical gain medium. Coupling apparatus is also provided for coupling pump light into the loop including the gain medium and for coupling optical pulses out of the source.

24 Claims, 3 Drawing Sheets

FIGURE EIGHT SHAPED COHERENT OPTICAL PULSE SOURCE

FIELD OF THE INVENTION

The present invention relates in general to generators of short optical pulses, and more particularly to all fiber laser generators of soliton pulses.

BACKGROUND OF THE INVENTION

Optical fibers are increasingly being used in the field of communications not only to transmit information, but also as repeaters to amplify the encoded optical signals. For example, amplifiers comprising erbium (Er) doped fibers are now commercially available from BT&D Technologies. See also, Mears, et al., "Low-noise erbium-doped fiber amplifier operating at 1.54 μm," *Electron. Lett.*, Vol. 23, pp. 1026 et seq. (1987); and Suzuki, et al., "Subpicosecond soliton amplification and transmission using $Er^{3+}$-doped fibers pumped by InGaAsP laser diodes," *Optics Letters*, Vol. 14, No. 16, pp. 865 et seq. (1989). The advent of such Er amplifiers presents the possibility of long-distance, high-speed soliton based communication. There is thus a need for a simple, inexpensive, efficient, and preferably all fiber source of solitons at a wavelength compatible with Er amplifiers and a repetition rate suitable for the new high speed communications systems.

Prior to the present invention, various types of short and soliton pulse lasers were known. For example, Mollenauer, et al., "The soliton laser," *Optics Letters*, Vol. 9, No. pp. 13-15 (January 1984), describes a synchronously pumped, mode-locked color-center laser coupled through a beam splitter to a feedback loop incorporating a length of single-mode, polarization-preserving fiber. As the laser action builds up from noise, the initially broad pulses are considerably narrowed by passage through the fiber. The narrowed pulses, reinjected into the main cavity, force the laser to produce narrower pulses This process builds upon itself until the pulses in the fiber become solitons, that is, until the pulses have substantially the same shape following their double passage through the fiber as they had upon entry. U.S. Pat. No. 4,635,263 to Mollenauer discloses the use of media other than color center lasers, such as semiconductors or the fiber itself to provide the necessary gain. In each case, such a soliton laser takes the form of a single loop ring laser having a short gain fiber coupled to a longer pulse shaping fiber. U.S. Pat. No. 4,835,778 to Kafka et al. discloses a subpicosecond fiber laser comprising an Er doped gain fiber joined to a pulse shaping fiber section in a resonant cavity in either a linear or single closed loop configuration. Initially formed pulses recirculate many times in the resonator to shorten the pulses until a steady state condition is reached. Stankov, "A Mirror with an Intensity-Dependent Reflection Coefficient," *Applied Physics B*, Vol. 45, pp. 191-195 (1988), describes the use of one type of nonlinear mirror with power dependent reflection to mode-lock a Nd:YAG laser and thereby obtain short light pulses of subpicosecond duration. In the Stankov device, an intense light beam at frequency $\omega$ generates a second harmonic beam in a nonlinear crystal. The total second harmonic at $2\omega$ and part of the fundamental beam are reflected by a dichroic mirror back through a phase-adjusting glass plate to provide the necessary phase relation between the two reflected light waves, and then back through the nonlinear crystal. In the second pass through the crystal, partial reconversion of the second harmonic into the fundamental wavelength takes place. The degree of conversion and reconversion is dependent on the intensity of the incident beam. U.S. Pat. No. 4,904,041 to Izadpanah discloses another example of a short optical pulse generator in which the optical radiation from a driven laser diode is coupled to an external cavity including a looped directional coupler which causes the laser to mode-lock and produce an output stream of very short high repetition pulses.

It was also known that optical soliton switching could be achieved in an all-fiber nonlinear loop mirror or Sagnac (anti-resonant ring) interferometer. See Doran, et al., "Nonlinear-optical loop mirror," *Optics Letters*, Vol. 13, No. 1, pp. 56-58 (January 1988); and Blow, et al., "Experimental demonstration of optical soliton switching in an all-fiber nonlinear Sagnac interferometer," *Optics Letters*, Vol. 14, No. 14, pp. 754-756 (July 1989) One embodiment of the present invention also employs a nonlinear amplifying mirror (NALM) developed by Fermann et al. for use in optical switching applications, which is described in "Nonlinear amplifying loop mirror," *Optics Letters*, Vol. 15, No. 13, pp. 752-754 (July 1990).

SUMMARY OF THE INVENTION

It is an object of the present invention to provide an improved passively mode-locked short optical pulse generator which is simple, inexpensive and efficient.

It is a further object of the present invention to provide a short optical pulse generator which is readily implemented as an all fiber device and which is compatible with conventional Er amplifiers.

It is a still further object of the present invention to provide a short optical pulse generator which is capable of soliton pulse generation.

It is another object of the present invention to provide a passively mode-locked pulse laser utilizing a nonlinear feedback loop with low switching threshold.

It is yet another object of the present invention to provide a pulse laser that does not require any electronic control or drive other than a continuous wave pump laser, and which permits any pulse repetition rate to be readily produced.

These and other objects and advantages are achieved in accordance with the present invention by an optical source for producing short optical pulses comprising first and second optical loops coupled together by a beam splitter so as to define a figure eight optical path in which a light beam propagating toward the beam splitter in one of the first and second loops is split by the beam splitter to form two light beams propagating in opposite directions around the other of the first and second loops. The first loop includes a direction dependent loss element for reducing the intensity of light propagating in a predetermined direction around the first loop, and the second loop includes an element having an intensity dependent nonlinear optical transmission characteristic. One of the first and second loops includes an optical gain medium. Coupling apparatus is also provided for coupling pump light into the loop including the gain element and for coupling optical pulses out of the source.

These and other features and advantages of the present invention are described in or apparent from the following detailed description of preferred embodiments.

BRIEF DESCRIPTION OF THE DRAWINGS

The preferred embodiments will be described with reference to the drawings, in which like elements have been denoted with like reference numbers throughout the figures, and in which.

DETAILED DESCRIPTION OF THE PREFERRED EMBODIMENTS

Figure 1A:
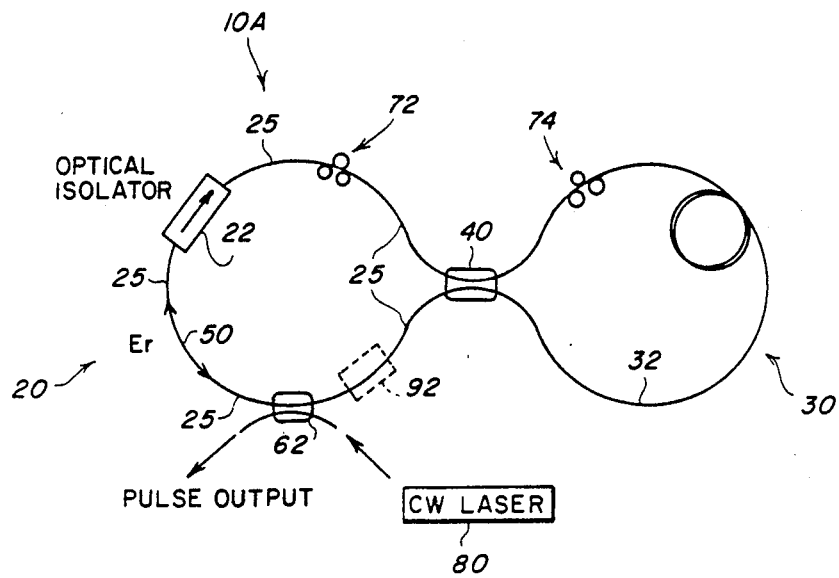
FIGS. 1A and 1B are schematic diagrams of an all fiber implementation and a bulk element implementation, respectively, of a first embodiment of an optical pulse generator or source constructed in accordance with the present invention.

Referring generally to the figures, an optical generator or source, generally denoted 10, for producing short optical pulses in accordance with the present invention generally comprises first and second optical loops 20 and 30, respectively, coupled together by a beam splitter 40 so as to define a figure eight optical path in which a light beam propagating toward beam splitter 40 in one of the loops 20 and 30 is split by beam splitter 40 to form two light beams propagating in opposite directions around the other of the loops 20 and 30. First loop 20 includes a direction dependent loss element or directional element 22 for reducing the intensity of light propagating in a predetermined direction around loop 20, and second loop 30 is configured to have an intensity dependent nonlinear optical transmission characteristic. An optical gain medium or element 50 is disposed in one of the loops 20 and 30. Optical coupling is also provided for coupling pump light into the loop including gain element 50, and for coupling optical pulses out of the source. As shown, in the fiber embodiment where gain element 50 is in first loop 20 (FIGS. 1A and 1C), either a single coupler 62 is provided in loop 20 for performing both functions (FIG. 1A), or separate couplers 61 and 63 are provided in the respective loops for providing the respective functions (FIG. 1C). In the fiber embodiment where gain element 50 is in second loop 30 (FIG. 2A), separate couplers 64 and 66 are disposed in the second and first loops 30 and 20, respectively, for performing the respective pump light coupling and output pulse coupling functions.

Referring specifically to FIG. 1A, an all fiber implementation 10A of a first embodiment of the present invention in which gain medium 50 is in first loop 20 comprises a length of rare earth doped single-mode optical fiber as gain medium 50. Preferably, an Er doped fiber, such as Type ER-2 manufactured by Corning Inc., is used to obtain soliton operation. Loss element 22 preferably is polarization independent if non-polarization preserving fiber is used to form loop 20, and advantageously comprises a fiber optical isolator for effectively blocking light travelling in the reverse direction. However, it will be appreciated that an element 22 providing direction dependent attenuation of light travelling within loop 20 is sufficient. Coupler 62 advantageously is configured as a combination conventional wavelength division multiplexer (WDM) coupler and splitter. The WDM parameters are selected according to the pump light source required for the type of gain medium 50 being used and the desired wavelength of the light to be generated within source 10; and the splitter parameters are preferably selected to split out up to approximately 20% of the internal pulse intensity as the output pulses. In the case of a source 10 being operated in a soliton mode with Er fiber as gain medium 50, coupler 62 is configured to couple all of the pump light at a 980 nanometer (nm) or 1.48 $\mu$m wavelength into loop 20 while splitting out up to 20% of the light in the 1.5 micron wavelength range. Loop 30 comprises a predetermined length of optical fiber 32, which may be either polarization preserving or non-polarization preserving. Advantageously, standard telecommunications optical fiber, such as Type SMF-28 manufactured by Corning, Inc., which has a value $\lambda_o = 1.3$ $\mu$m and dispersion of 16 ps/nm-km, is employed as fiber 32. In that case, loops 20 and 30 are provided with conventional polarization controllers 72 and 74, as shown. Controllers 72 and 74 are disposed adjacent beam splitter 40 so as to permit polarization compensation of the light beams entering beam splitter 40 for random birefringence present in a non-polarization preserving fiber. Controller 72 also permits compensation of the polarization shift which typically is produced by conventional optical isolators. Controller 74 can also be used to adjust the linear phase offset of counterpropagating light within loop 30, as discussed in more detail hereinbelow.

In a variant version 10C of source 10A, as shown in FIG. 1C, a separate pump WDM coupler 61 is provided in loop 20, and an output splitter 63 is disposed asymmetrically within loop 30 adjacent beam splitter 40.

In source 10A, beam splitter 40 has a reflectivity or splitting ratio different than 50:50, and in source 10C, beam splitter 40 has a splitting ratio of 50:50. In both cases, loop 30 and beam splitter 40 operate as a nonlinear Sagnac interferometer. The interferometer functions within optical source 10A as a passive transmissive nonlinear optical loop mirror (NOLM). The difference in beam splitter reflectivity (source 10A) or the asymmetrically placed loss (source 10C) causes the light beams travelling in opposite directions around loop 30 to be of different intensities. Due to the nonlinear character of fiber 32, the different intensities cause the counterpropagating light beams in loop 30 to acquire a differential phase shift, and therefore incomplete interference of the high intensity portions of the light beams in loop 30 on interaction at beam splitter 40. There is also some leakage of even low intensity light from beam splitter 40, but the high intensity portions of the light travel around loop 20 in a direction opposite to that of the low intensity portions. Loss element 22 is arranged to favor the high intensity portions of the light travelling in loop 20, which allows those portions to be preferentially amplified by gain medium 50. As the light evolves inside source 10A, the internal peak power increases, and the transmission of the interferometer increases, lowering the losses within the source for the most intense light. This process favors the production of pulses over continuous light and results in spontaneous mode-locking of source 10A.

It will be appreciated that there must be enough noise within the source to start lasing operation in response to inputted pump light. One way to obtain noise within the source is to adjust the low intensity transmission characteristic of loop 30 so that a small amount of low intensity light is transmitted by beam splitter 40, and thus that a small amount of CW lasing is present at start-up. This is accomplished when the splitting ratio of beam splitter 40 is set not equal to 50:50; and can also be accomplished when non-polarization preserving fiber is used in loop 30 by adjusting polarization controller 74 so as to adjust the linear phase offset of counterpropagating light within loop 30. In addition, it has been observed that above a certain pump light power threshold, self-starting occurs. The fiber type used within source 10 and the splitter ratio of beam splitter 40 affect the value of the threshold.

Gain medium 50, loss element 22 and coupler 62 are connected in loop 20 by conventional telecommunications optical fiber 25, which may be the same as that used for fiber 32. For soliton operation with an Er doped fiber as gain medium 50, the pump light wavelength is preferably in the range of either 980 nm or 1.48 $\mu$m. a conventional continuous wave (CW) laser 80, such as a 1.48 $\mu$m wavelength diode laser Model OL4-3A-100 manufactured by OKI, advantageously provides the source of pump light.

Figure 1B:
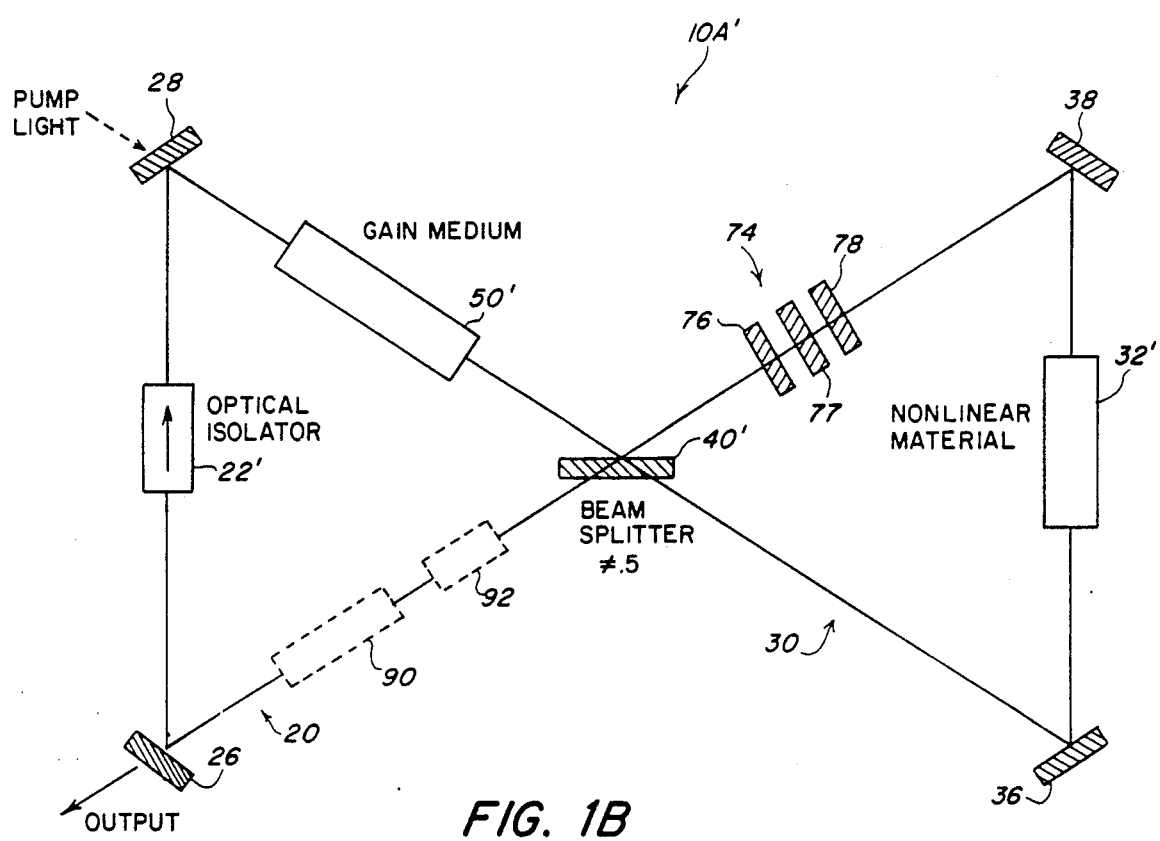
Figure 1C:
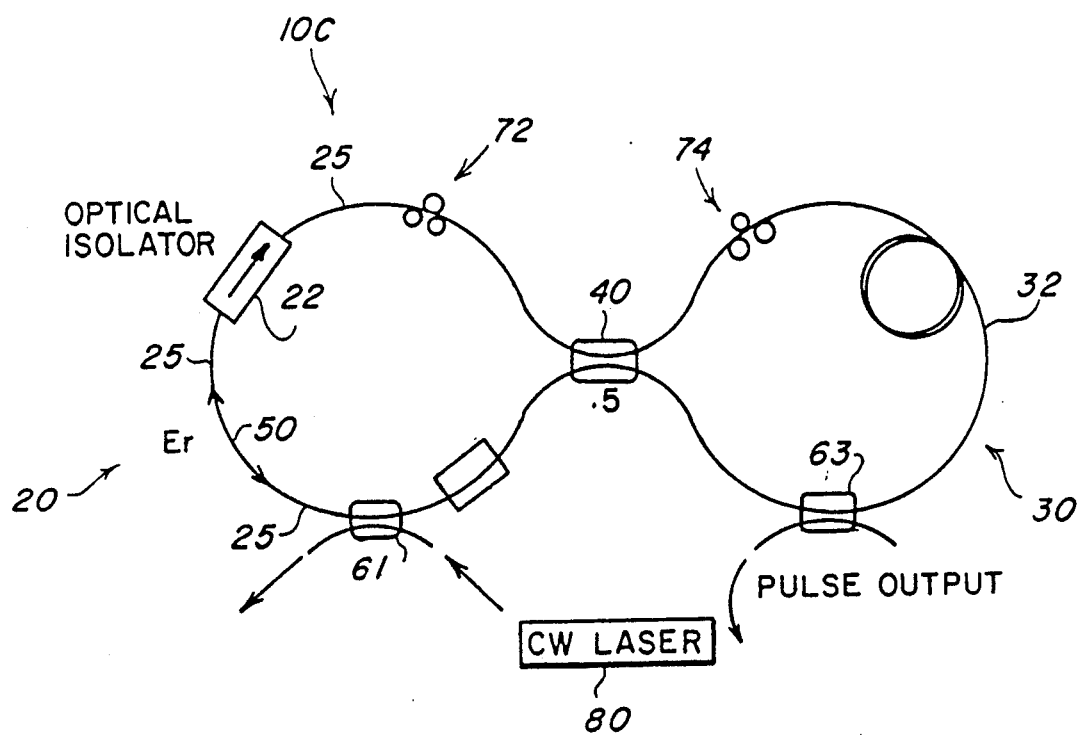
FIG. 1C is a schematic diagram of a variant of the optical pulse generator of FIG. 1A.

Referring to FIG. 1B, a bulk element implementation 10A' of the all fiber source 10A shown in FIG. 1A comprises a bulk optic beam splitter 40' having a splitting ratio different than 50:50, a first pair of mirrors 26 and 28 disposed relative to beam splitter 40' so as to define loop 20, and a second pair of mirrors 36 and 38 disposed relative to beam splitter 40' so as to define loop 30. A bulk optic gain medium 50', such as, for example, a titanium-sapphire rod optically pumped by an argon laser or a color center laser, is disposed in a first leg of loop 20, and a bulk optic direction dependent loss element 22', such as an optical isolator, is disposed in a second leg of loop 20, as shown. A bulk optic element 32' made of intensity dependent refractive index material, such as a SF-6 flint glass, is disposed in the leg of loop 30 extending between mirrors 36 and 38. Mirror 26 is a partially reflective mirror so as to constitute the coupler 60 for coupling the output pulses from source 10. Mirror 28 advantageously is a dichroic mirror for use with an optically pumped gain medium to permit inputting (coupling) of pump light into loop 20. A series of two quarter wave plate birefringent elements 76 and 78 and an intermediate half wave birefringent element 77 advantageously are disposed in one leg of loop 30 to permit adjustment of the linear phase offset in loop 30. It will be appreciated that source 10A' operates in the same manner as source 10A. It will also be appreciated that while mirrors 26, 28, 36 and 38 have been schematically shown in FIG. 1B (and FIG. 2B) as being flat, bulk optics of appropriate optical power, e.g., curved mirrors and/or lenses, advantageously are employed to provide a stable laser cavity.

Figure 2A:
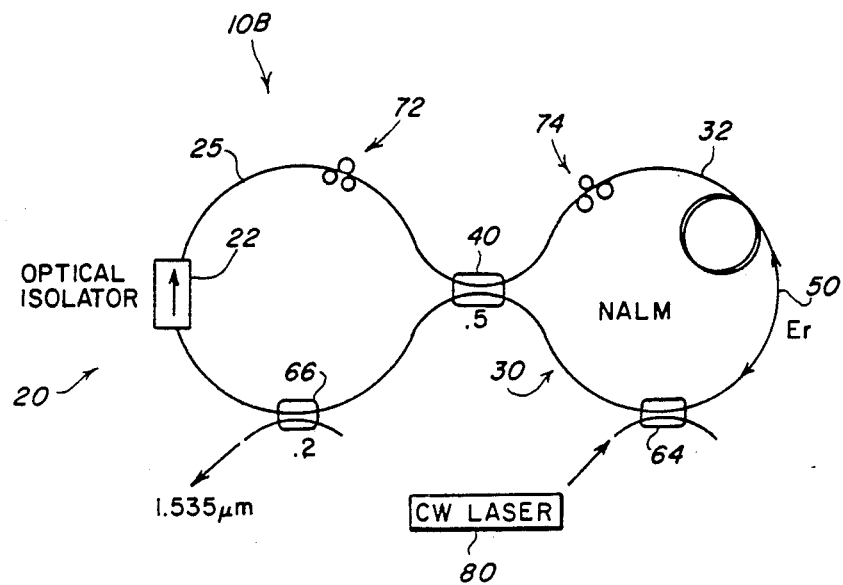
FIGS. 2A and 2B are schematic diagrams of an all fiber implementation and a bulk element implementation, respectively, of a second embodiment of an optical pulse generator or source constructed in accordance with the present invention.

Referring to FIG. 2A, an all fiber version 10B of a second embodiment of an optical pulse source constructed in accordance with the present invention is similar to source 10A except that gain medium 50 is asymmetrically connected in loop 30, preferably adjacent beam splitter 40, as shown; beam splitter 40 has a splitter ratio of 50:50; and separate couplers 64 and 66 are provided in loops 30 and 20, respectively. Similarly to couplers 62 and 61 (FIGS. 1A and 1C), pump coupler 64 advantageously is a conventional WDM coupler configured in accordance with the pump light source appropriate for the type of gain medium 50 being used, and the intended wavelength of the light to be generated within source 10. Output coupler 66 advantageously is a 20% splitter at the output wavelength of source 10, similar to couplers 62 and 63 (FIGS. 1A and 1C).

In source 10B, beam splitter 40 and loop 30 function as a NALM. As light propagates within source 10B, light entering beam splitter 40 from loop 20 is split equally into clockwise and counterclockwise propagating beams within loop 30. One beam is amplified by gain medium 50 prior to propagating around loop 30, and the other is amplified after propagating around the loop. The amplified beams return to beam splitter 40 at the same amplitude, but one beam has acquired a nonlinear phase shift relative to the other. Similarly to the operation of a NOLM, this shift causes the high intensity portions of the beams to be transmitted through beam splitter 40, while the low intensity portions tend to be reflected back in the directions that the beams entered beam splitter 40. Directional element 22 favors the transmission and amplification in the NALM of the high intensity portions of the light, resulting in mode-locking of source 10B and shortening and amplification of the generated pulses each time they pass through the NALM portion of source 10B.

Figure 2B:
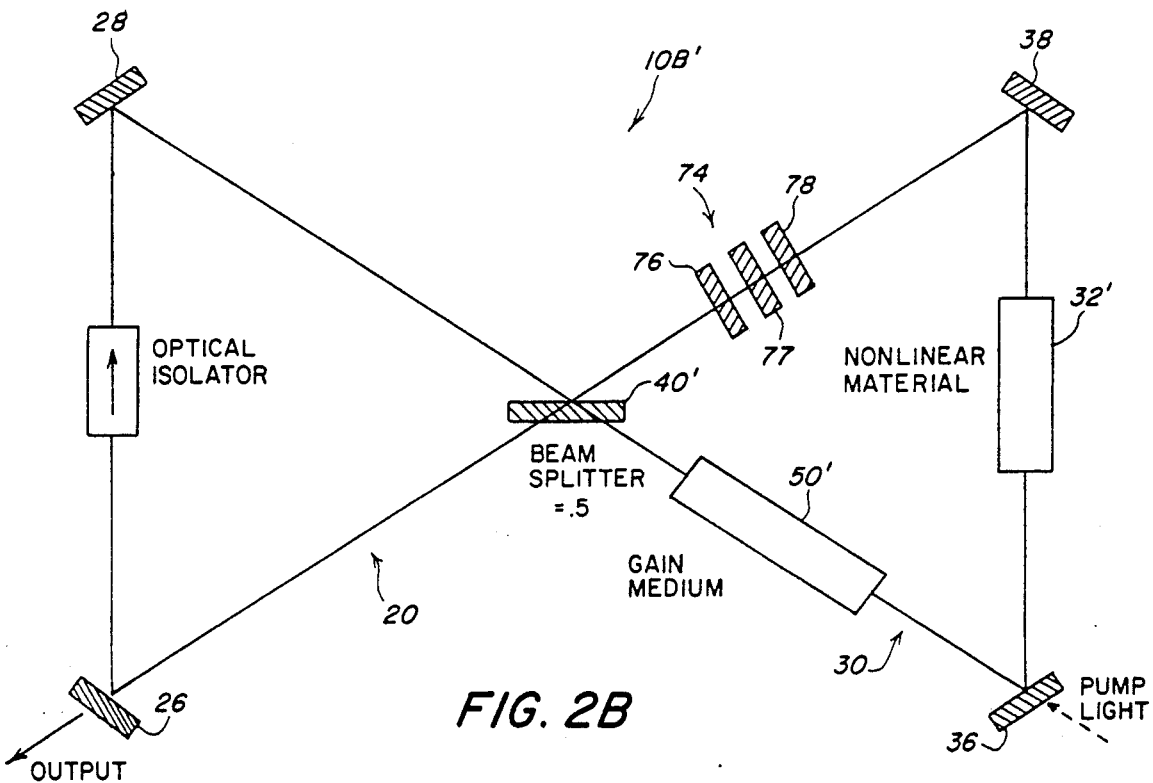

Referring to FIG. 2B, a bulk element implementation 10B' of the all fiber source 10B shown in FIG. 2A is similar to source 10A' except that bulk optic beam splitter 40' has a splitting ratio of 50:50; and bulk optic gain medium 50' is disposed in a leg of loop 30 adjacent beam splitter 40', as shown. In this implementation, mirror 36 advantageously is a dichroic mirror for inputting of pump light for gain medium 50' into loop 30. It will be appreciated that source 10B' operates in the same manner as source 10B.

If the sign of the overall average dispersion within source 10 for one round trip is such that the pulse broadening due to linear dispersion can be compensated by that of nonlinear dispersion (self-phase modulation), then the pulses generated by source 10 exist as solitons. In the fiber versions of source 10 (sources 10A and 10B), this is accomplished by operating the source in the correct wavelength range relative to the zero dispersion wavelength of the fiber forming the source components. For the bulk optic versions of source 10 (sources 10A' and 10B'), the proper dispersion sign can be provided by a bulk optical unit 90 (FIG. 1B) such as a pair of gratings or a prism sequence similar to those used in conventional optical pulse compression techniques.

Since source 10 has no active modulation, it can produce pulses at any repetition rate desired that is an integer multiple of the round trip propagation time, which in turn is determined by the optical length of loops 20 and 30. Advantageously, in order to ensure that the repetition rate is stable, and that the same repetition rate is produced by a given source configuration each time the source is started, a modulator element 92 is inserted in loop 20 as shown in FIGS. 1A and 1B. In the case of the all fiber versions of source 10, element 92 advantageously is a fiber low finesse Fabry-Perot element. In the case of the bulk optic versions of source 10, element 92 can be either an active modulator, or a passive Fabry-Perot device. The length of Fabry-Perot implementation, and the frequency of a modulator implementation of element 92 determines the repetition rate.

An embodiment of source 10B (FIG. 2A) has been successfully operated with a fiber 32 length of 30 meters, including the length of leads for coupler 64 (the length of loop 20 being negligible in comparison). The source ran at a repetition rate of approximately 5 MHz, produced close to 1 mW of output power, and produced output pulses of approximately 2.1 ps in length with a lasing bandwidth of 1.2 nm. Thus, the time-bandwidth product is 0.32, which indicates that the pulses are substantially transform limited. Varying the polarization controllers 72 and 74 allows the pulse duration to be lengthened with a corresponding narrowing of the spectrum. Shorter loop lengths and the use of lower dispersion fibers should provide shorter pulse widths.

The present invention has been described with respect to exemplary embodiments. It will be appreciated that numerous changes and modifications can be made without departing from the scope or spirit of the invention.

WHAT IS CLAIMED AND DESIRED TO BE SECURED BY LETTERS PATENT OF THE UNITED STATES IS:

1. An optical pulse source for producing short optical pulses comprising:
   first and second optical loops coupled together by a beam splitter so as to define a figure eight optical path in which a light beam propagating toward said beam splitter in one of said first and second loops is split by said beam splitter to form two light beams propagating in opposite directions around the other of said first and second loops, said first loop including direction dependent loss means for reducing the intensity of light propagating in a predetermined direction around said first loop, said second loop including nonlinear means having an intensity dependent nonlinear optical transmission characteristic, and a first one of said first and second loops including an optical gain medium;
   means for coupling pump light into said first one of said first and second loops including said gain medium, and for coupling optical pulses out of said source.

2. The optical pulse source of claim 1 wherein said gain medium is in said first loop.

3. The optical pulse source of claim 2 wherein said gain medium is a rare earth doped single-mode optical fiber.

4. The optical pulse source of claim 3 wherein erbium is the rare earth.

5. The optical pulse source of claim 2 wherein said gain medium is a color center laser.

6. The optical pulse source of claim 2 wherein said gain medium is an optically pumped titanium-sapphire element.

7. The optical pulse source of claim 1 wherein said loss means comprises an optical isolator.

8. The optical pulse source of claim 2 wherein said nonlinear means comprises an optical fiber forming said second loop and said beam splitter has a reflectivity ratio different than 50:50 such that said second loop operates as a passive NOLM.

9. The optical pulse source of claim 2 wherein said nonlinear means comprises an optical fiber forming said second loop, said coupling means comprises a splitter coupler asymmetrically disposed in said second loop adjacent said beam splitter, and said beam splitter has a reflectivity ratio of 50:50 such that said second loop operates as a passive NOLM.

10. The optical pulse source of claim 2 wherein said second loop comprises first and second optical reflector elements disposed so as to form an optical loop light path with said beam splitter; and said nonlinear means comprises a bulk optical element made of intensity dependent refractive index material disposed in said second loop.

11. The optical pulse source of claim 1 wherein said gain medium is in said second loop.

12. The optical pulse source of claim 11 wherein said gain medium is a rare earth doped single-mode optical fiber.

13. The optical pulse source of claim 13 wherein erbium is the rare earth.

14. The optical pulse source of claim 11 wherein said gain medium is a color center laser.

15. The optical pulse source of claim 11 wherein said gain medium is an optically pumped titanium-sapphire element.

16. The optical pulse source of claim 11 wherein said loss means comprises an optical isolator.

17. The optical pulse source of claim 12 wherein said nonlinear means comprises an optical fiber forming part of said second loop and said beam splitter has a reflectivity ratio of 50:50 such that said second loop operates as a NALM.

18. The optical pulse source of claim 11 wherein said second loop comprises first and second discrete optical reflector elements disposed so as to form an optical loop light path with said beam splitter; and said nonlinear means comprises a discrete optical element made of intensity dependent refractive index material disposed in said second loop.

19. The optical pulse source of claim 1 further comprising means for adjusting the linear phase offset of counter-propagating light in said second loop.

20. The optical pulse source of claim 9 further comprising a first polarization controller in said second loop for adjusting the linear phase offset of counterpropagating light in said second loop.

21. The optical pulse source of claim 18 wherein said second loop further comprises discrete means for adjusting the linear phase offset of counterpropagating light in said second loop.

22. The optical pulse source of claim 21 wherein said linear phase offset adjusting means comprises first and second quarter wave plate birefringent elements disposed in said second loop and a half wave plate birefringent element disposed in said second loop intermediate said first and second quarter wave plate birefringent elements.

23. The optical pulse source of claim 3 wherein said first loop comprises non-polarization preserving fiber and a second polarization controller is provided in said first loop for compensating the polarization of the light beam entering said beam splitter from said first loop.

24. The optical pulse source of claim 17 wherein said pump light coupling means comprises a fiber WDM coupler forming part of said second loop.

* * * * *